(12) United States Patent
Raj et al.

(10) Patent No.: US 6,231,194 B1
(45) Date of Patent: May 15, 2001

(54) PROJECTION SYSTEM

(75) Inventors: Kannan Raj, Chandler; Lawrence A. Booth, Jr., Phoenix, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/277,348

(22) Filed: Mar. 26, 1999

(51) Int. Cl.[7] .................................................. G03B 21/14
(52) U.S. Cl. .............................................. 353/122; 359/142
(58) Field of Search ...................................... 353/101, 122, 353/42; 345/169, 176, 207; 359/142, 148

(56) References Cited

U.S. PATENT DOCUMENTS

| | | | |
|---|---|---|---|
| 3,775,005 | * | 11/1973 | Szabo ...................................... 353/84 |
| 5,115,230 | * | 5/1992 | Smoot . |
| 5,235,363 | * | 8/1993 | Vogeley et al. ....................... 353/122 |
| 5,914,764 | * | 6/1999 | Henderson ............................. 349/161 |
| 5,917,464 | * | 6/1999 | Stearns .................................... 345/87 |
| 5,952,996 | * | 9/1999 | Kim et al. .............................. 345/158 |

* cited by examiner

*Primary Examiner*—William Dowling
(74) *Attorney, Agent, or Firm*—Trop, Pruner & Hu, P.

(57) ABSTRACT

A projection system includes a display panel, a light modulator and at least one light sensor. The display panel has an exterior surface that is adapted to receive a first light wave that is indicative of at least one command. An interior surface of the display panel is adapted to receive a second light wave to form an image on the display panel. The light modulator is adapted to produce the second light wave, and the light sensor(s) are adapted to furnish an electrical indication of the command(s) in response to the first light wave.

20 Claims, 10 Drawing Sheets

PROJECTION SYSTEM

BACKGROUND

The invention generally relates to a projection system.

An ever-increasing number of applications are using display devices that are derived from a combination of liquid crystal optics technology and semiconductor technology. For example, these display devices may be used in mobile telephones, projection systems, home entertainment systems and monitors for personal computers.

Examples of these display devices may include field emission displays (FEDs) and spatial light modulators (SLMs). For example, the SLMs may be used in a projection system to form a modulated beam image, and for color projection systems, the system may have one SLM for each primary color channel (red, green and blue (RGB) primary color channels, as examples) of the projection system. As an example, to form a projected multicolor image, one SLM may modulate a red beam (of the red channel) to form a red modulated beam image, one SLM may modulate a green beam (of the green channel) to form a green modulated beam image, and another SLM may modulate a blue beam (of the blue channel) to form a blue modulated beam image. In this manner, the red, green and blue modulated beam images combine on a projection screen to form the multicolor image.

A conventional color projection system 10 is illustrated in FIG. 1. The projection system 10 may include a light source 28 that generates a beam of white light. For purposes of separating the beam of white light into its primary red, green and blue beams (of the different color channels), the projection system 10 may include dichroic beam splitters 12 and 16. In this manner, the dichroic beam splitter 12 may separate a red beam, for example, from the white beam of light, and a mirror 13 may reflect the red beam to a polarizing beam splitter 19 that, in turn, reflects the red beam to a reflective SLM 14 that modulates the red beam. The polarizing beam splitter 19 directs the resultant green modulated beam of light to an X-cube prism 24 that directs the modulated beam through projection optics 26 to form one component of the multicolor image, the green modulated beam image, on a display screen (not shown). The projection system 10 typically includes additional optical devices, such as the dichroic beam splitter 16, and polarizing beam splitters 17 and 22 to direct the unmodulated green and blue beams (from the original white beam) to an SLM 18 and an SLM 20, respectively. The polarizing beam splitters 17 and 22 and the X-cube prism 24 direct the resultant green and blue modulated images through the projection optics 26 to form the remaining components of the multicolor image.

In the projection system 10, optical communication with a viewer of the system 10 occurs in one general direction, i.e., in the general direction from the SLMs 14, 18 and 20 to the display screen. However, the projection system 10 may need input from the viewer. For example, the projection system may be part of a computer system that is used to establish an interactive gaming environment. In this manner, the viewer of the display may provide input through a remote control device, for example, to change the image or as another example, to alter sound that is associated with the image. Unfortunately, the computer system may need an additional device, such as an infrared receiver, to receive and decode an infrared light wave from the remote control device.

Thus, there is a continuing need for a system that addresses one or more of the problems stated above.

SUMMARY

In one embodiment, a projection system includes a display screen, a light modulator and at least one light sensor. The display panel has an external surface that is adapted to receive a first light wave that is indicative of at least one command. An interior surface of the display panel is adapted to receive a second light wave to form an image on the display panel. The light modulator is adapted to produce the second light wave, and the light sensor(s) are adapted to furnish an electrical indication of the command(s) in response to the first light wave.

In another embodiment, a method includes forming an image on a display panel and receiving a light wave through the display panel. The light wave is indicative of a command. The method includes decoding the command after the receiving.

DETAILED DESCRIPTION

Figure 1:
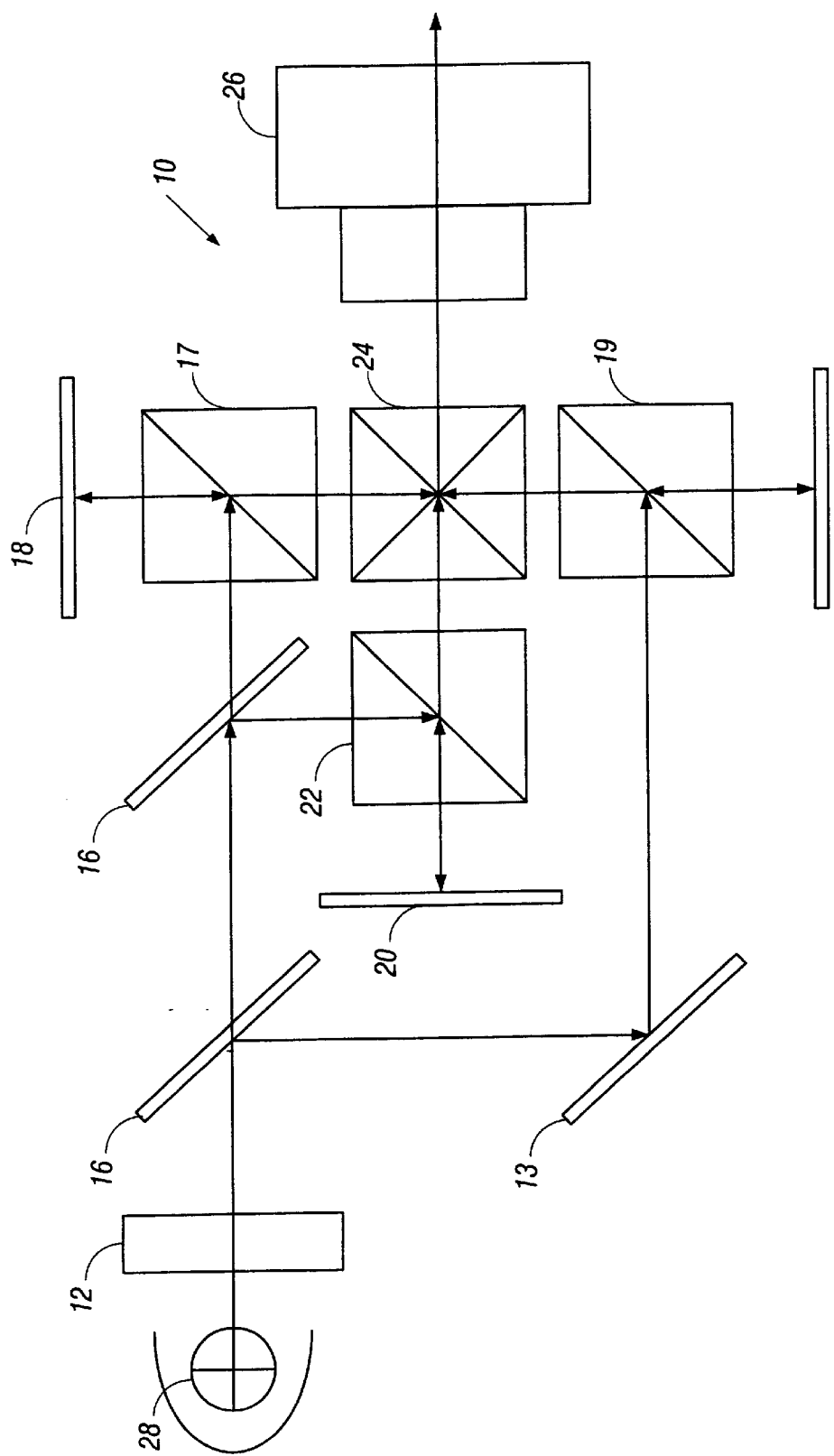
FIG. 1 is a schematic diagram of a projection system of the prior art.
Figure 2:
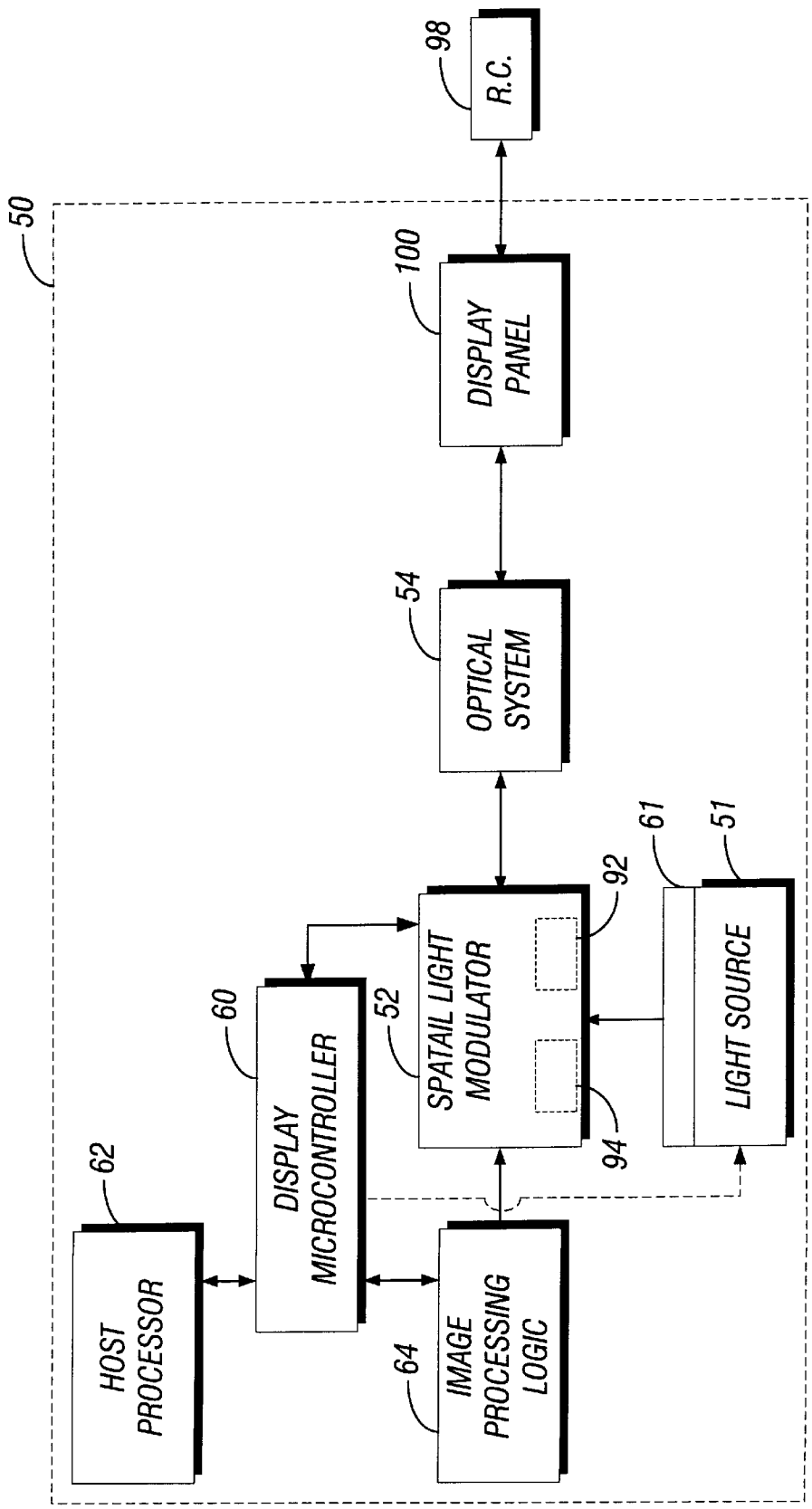
FIG. 2 is a schematic diagram of a projection system according to an embodiment of the invention.

Referring to FIG. 2, an embodiment 50 of a projection system in accordance with the invention includes at least one spatial light modulator (SLM) 52 that includes pixel cells 94 for forming corresponding pixels of a displayed image. More particularly, each pixel cell 94 receives a voltage that establishes the intensity of light that is reflected by the pixel cell 94 to form a corresponding pixel of the image. Collectively, the pixel cells 94 modulate an unmodulated beam of light that is provided by a light source 51 to produce an outgoing light wave, or modulated beam, that is focused by an optical system 54 to form the image on a display panel 100. In some embodiments, the pixel cells may be liquid crystal display (LCD) cells, and in some embodiments, at least a portion of the SLM 52 may effectively form an LCD display panel, as described below.

Figure 17:
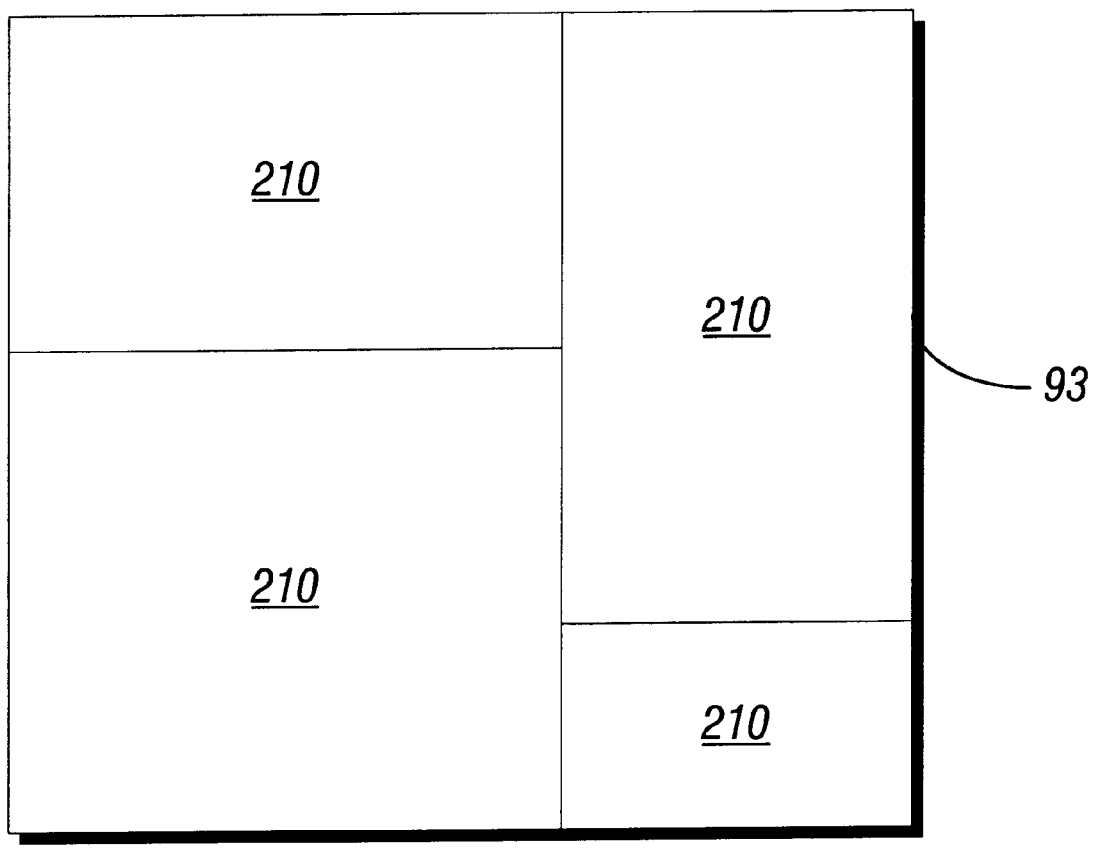
FIG. 17 is an illustration of viewing areas of the display panel.

In addition to observing the image that is formed on the display panel, a viewer of the image may operate a remote control 98 to interact with the projection system 50. As just a few examples, this interaction may include directing the execution of a software program that generates the image, changing characteristics (a color, a tint or a size, as examples) of the image and/or changing an audible level of a speaker (not shown) of the projection system 50. As described further below, the operation of one or more remote controls may be used to interact with several application display windows 210 (see FIG. 17) that appear on an exterior surface 93 on the display panel 100. In this manner, each window 210 may be displaying an image that is formed by the execution of a separate application program. For example, one particular window 210 may display a video image, another window 210 may display an image formed by an Internet browser application and another window 210 may display an image formed by an Internet news channel, as just a few examples.

The operation of a particular remote control 98 may produce a time-varying infrared light wave that indicates one or more specific commands for the projection system 50. Unlike conventional systems, in some embodiments, the projection system 50 may not use an infrared receiver to receive the infrared light wave and decode the command(s). Instead, in some embodiments, the projection system 50 may take advantage of existing projection hardware to receive the infrared light wave and allow the system 50 to decode the command(s). More particularly, in some embodiments, the display panel 100 may be adapted to receive the infrared light wave, and the optical system 54 may be adapted to form an image of the infrared light wave on light sensors 92 of the projection system 50. In some embodiments, the light sensors 92 may be part of the SLM 52, as described below. A display microcontroller 60 (that is coupled to the light sensors 92) may decode the command(s) based on intensities that are detected by the light sensors 92, and the display microcontroller 60 may communicate indications of the decoded commands to a host processor 62 so that the host processor 62 may take appropriate action(s) to service the command(s). For purposes of generating the image, the display microcontroller 60 may interact with image processing logic 64, a circuit that generates signals to drive the modulation by the SLM 52.

In some embodiments, the modulated beam that is produced by the SLM 52 and the infrared light wave that is produced by the remote control 98 travel along directionally opposed optical paths through the optical system 54. Therefore, as described further below, the projection system 50 may be a bi-directional optical communication system.

Due to this bi-directional optical communication, the infrared light wave may be "washed out" by the modulated beam if not for multiplexing features that are introduced by the projection system 50. For example, in some embodiments, the projection system 50 may time multiplex the propagation of the modulated beam and the infrared light wave through the optical system 54 so that only the infrared wave or the modulated beam is propagating through the optical system 54 at a given moment. More particularly, the display microcontroller 60 may be coupled to the light source 51 and adapted to selectably control when the light source 51 produces the unmodulated beam and thus, control the production of the modulated beam. As an example, the display microcontroller 60 may operate a shutter 61, for example, of the light source 51 to effectively turn on and off the unmodulated beam and thus, turn on and off the modulated beam. As an example, in some embodiments, although the shutter may be generally open, the display microcontroller 60 may operate the shutter 61 in a manner that to briefly turn off the modulated beam at regular intervals. The turning off of the modulated beam permits the incoming infrared light wave to travel through the optical system 54 and be detected by the light sensors 92 without being "washed out" by the modulated beam.

In other embodiments, the projection system 50 may include filters to effectively multiplex the wavelengths of the infrared light wave and the modulated beam. In this manner, the filters may band limit the incoming infrared light wave and the outgoing modulated beam so that the infrared light wave and the modulated beam exist on separate optical channels, an arrangement that permits both the infrared light wave and the modulated beam to concurrently exist in the optical system 54. More particularly, a filter 63 (see FIG. 3) may band limit the unmodulated beam to ensure that most of the spectral energy of the modulated beam is associated with wavelengths in the range of approximately 400 to 780 nanometers (nm), and a filter 90 (see FIG. 3) of the optical system may filter the incoming infrared light wave to ensure that spectral components of the infrared light wave that travels through the optical system 54 have wavelengths greater than approximately 780 nm. As a result of this arrangement, a control optical channel is created inside the projection system 50 to direct the infrared beam to the light sensors 92, and a display optical channel is formed inside the projection system 50 to direct the modulated beam from the pixel cells 94 to the display panel 100 to form the image.

Figure 3:
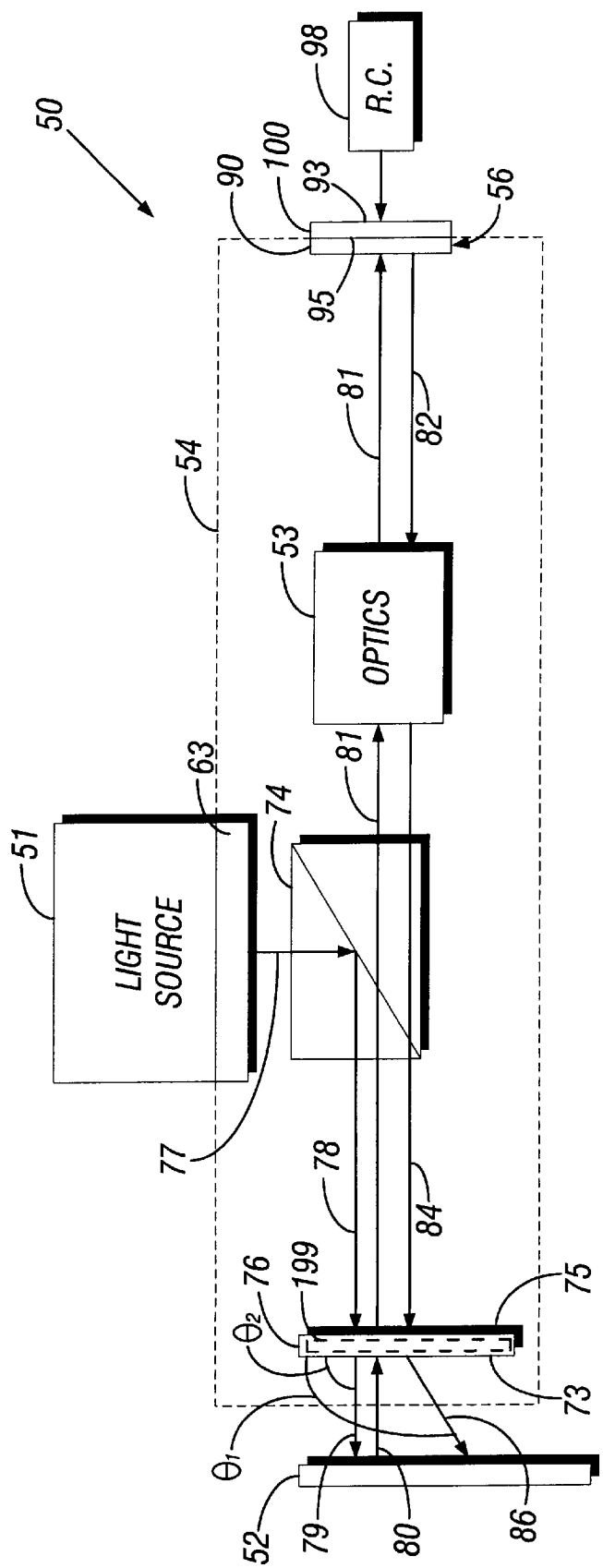
FIG. 3 is another schematic diagram of a portion of the projection system of FIG. 2 illustrating an optical system of FIG. 2 in more detail.

More particularly, FIG. 3 depicts a side view of a portion of the projection system 50 and illustrates the optical system 54 in greater detail. To form the displayed image, an unmodulated beam follows an optical path 77 from the light source 51 toward a polarizing beam splitter 74 (of the optical system 54). The polarizing beam splitter 74, in turn, directs the unmodulated beam along an optical path 78 that generally extends toward the SLM 52.

The infrared light wave is directed to the light sensors 92 in the following manner. The infrared light wave is incident upon the exterior surface 93 of the display panel 100. The filter 90 may be attached (for example) to an interior surface 95 of the display panel 100 to form a display screen assembly 56. In this manner, the display screen assembly 56 filters the infrared light wave to produce a band-limited infrared beam that exits the display screen assembly 56 to follow an optical path 82. Traveling along the optical path 82, the infrared beam encounters optics 53 (of the optical system 54) that direct the infrared beam light wave toward and along an optical path 84 that generally extends toward the SLM 52. In some embodiments, the optical paths 78 and 84 may be substantially parallel to each other.

In some embodiments, to direct the infrared and unmodulated beams to the SLM 52, the projection system 50 may include a holographic beam splitter 76, a component of the optical system 54 that receives the infrared and unmodulated beams and diffracts each beam based on the wavelengths of the spectral components of the beam, i.e., the holographic beam splitter 76 diffracts each beam based on its associated optical channel. Thus, the diffraction imposed by the holographic beam splitter 76 to the unmodulated beam is different than the diffraction imposed by the holographic beam splitter 76 to the infrared beam. As a result, these two beams exit the holographic beam splitter 76 along diverging separate optical paths 86 (for the control optical channel) and 79 (for the display optical channel) toward the SLM 52.

As an example, the unmodulated beam enters an incident face 75 of the holographic beam splitter 76 along the optical path 78 that is substantially angularly aligned to a normal of the face 75. An angle (called $\theta_1$) at which the unmodulated beam exits an opposite face 73 of the holographic beam splitter 76 is controlled by an interference pattern (called a hologram) that is associated with the display optical channel and is stored in the holographic beam splitter 76.

Similarly, the holographic beam splitter 76 stores a hologram that is associated with the control optical channel. In this manner, this hologram diffracts the infrared beam to cause the infrared beam to exit the face 73 at an angle called $\theta_2$ and follow the optical path 86. Thus, each stored hologram is associated with a different optical channel, and because each hologram is highly wavelength selective, each hologram does not diffract the beam that is associated with the other channel.

The angles $\theta_1$ and $\theta_2$ at which the holographic beam splitter 76 directs the unmodulated and infrared beams may or may not lie in the same plane. For example, the beam "mapping" introduced by the holographic beam splitter 96 may be more generally described by spherical angular coordinates called $\phi$ and $\theta$. This flexibility permits, as an example, a horizontal region on the exterior surface 93 of the display panel 100 to be mapped to a vertical column of light sensors 92 on the SLM 52, as further described below.

Once modulated by the SLM 52, the resultant modulated beam returns along a path similar to the path that is traveled by the unmodulated beam. More particularly, the modulated beam follows an optical path 80 back to the holographic beam splitter 76. The optical path 80 is parallel with but directionally opposed to the optical path 79. Because the modulated beam enters the face 73 of the holographic beam splitter 76 at approximately the $\theta_1$ angle (i.e., the angle at which the unmodulated beam exits the face 73), the modulated beam exits the opposite face 75 of the holographic beam splitter 76 along an optical path 81 that approximately follows (in a reverse direction) the optical path 78 that is followed by the unmodulated beam. The modulated beam follows the optical path 81 through the polarizing beam splitter 74 and to the projection optics 53 that focus the modulated beam to form the displayed image.

The advantages of the above-described projection system may include one or more of the following: the projection system may provide bi-directional optical communication; the quality of optical communication may be improved; the functionality of optical communication may be improved; costs may be reduced; both global and local control of pixels may be achieved; and complexity of the projection system may be reduced.

Figure 4:
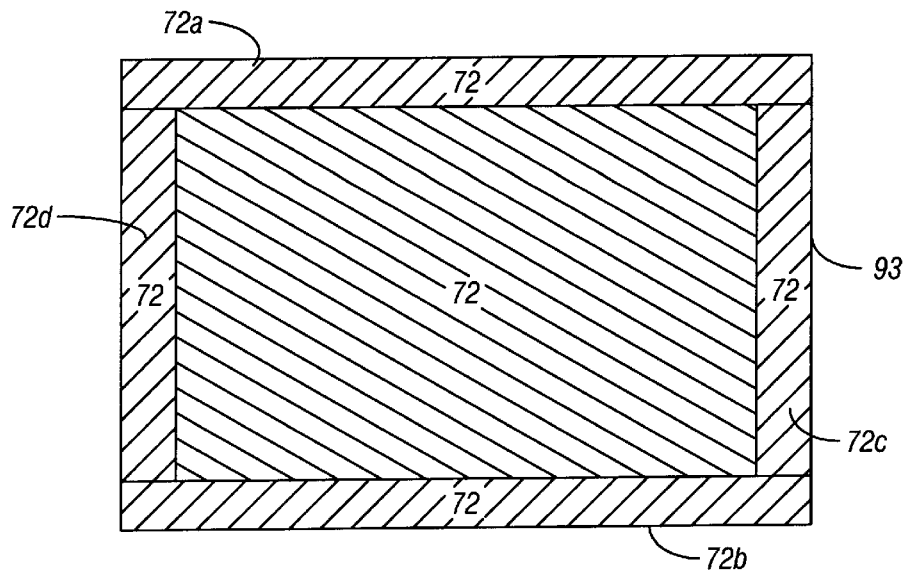
FIGS. 4 and 7 are illustrations of display and command receiving areas of a display panel of FIG. 2 according to different embodiments of the invention.

Referring to FIG. 4, in some embodiments, the exterior surface 93 of the display screen assembly 56 may include a display area 70 (a rectangular area, for example) for viewing the image and one or more receiving areas 72 (areas 72a, 72b, 72c and 72d, as examples) for receiving the infrared wave. As an example, the receiving areas 72 may be located around the periphery of the exterior surface 93, and each receiving area 72 may be associated with a different infrared bandstop frequency. In this manner, each receiving area 72 may select a different range of wavelengths to form a different infrared control channel inside the projection system 50, and groups of the light sensors 92 may be associated with the different infrared control channels. The holographic beam splitter 76, in turn, may store a hologram for each control channel to direct the beam that is associated with the channel to the appropriate light sensors 92. As examples, one receiving area 72a may be associated with a control for an interactive game and another receiving area 72b may be associated with a brightness of the displayed image, for example. One or more remote controls 98 may be used to generate infrared light waves that are associated with the different infrared control channels.

Figure 5:
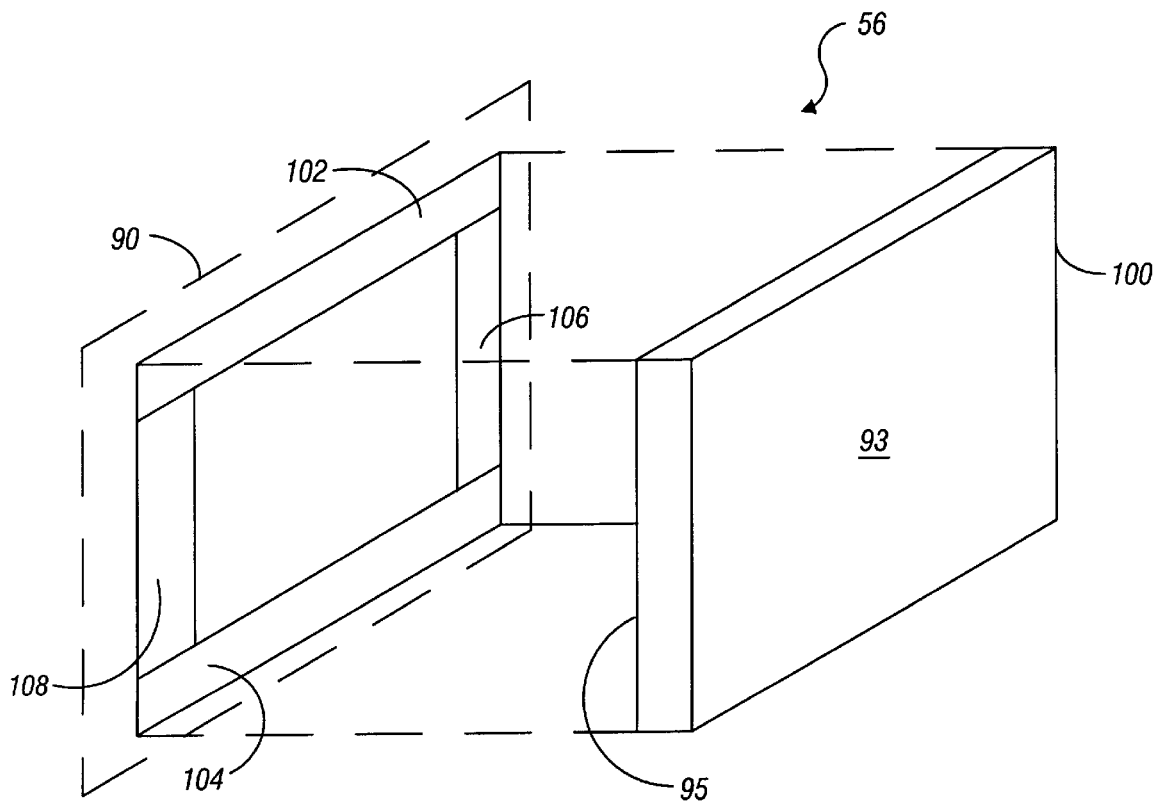
FIG. 5 is an exploded side view of the display screen assembly of FIG. 2 according to an embodiment of the invention.

Referring to FIG. 5, to form the areas 72 of the exterior surface 93, the display screen assembly 56 may include the display panel 100, a panel that may be translucent, and the filter 90 may include infrared filter sections 102, 104, 106 and 108 that may be attached to the interior face of the panel 100 to form the receiving areas 72a, 72b, 72c and 72d, respectively. Other arrangements are possible.

Figure 6:
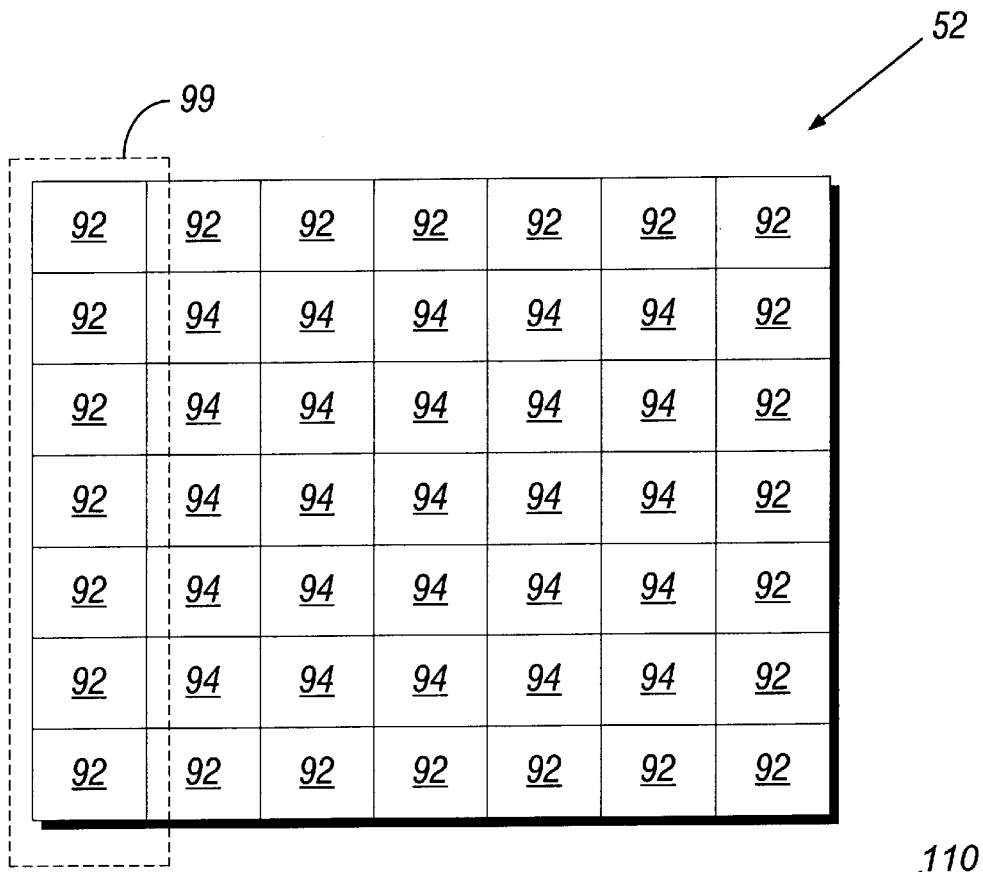
FIGS. 6 and 8 are illustrations of arrangements of pixel cells and light sensors of a spatial light modulator of FIG. 2 according to different embodiments of the invention.
Figure 7:
Figure 8:
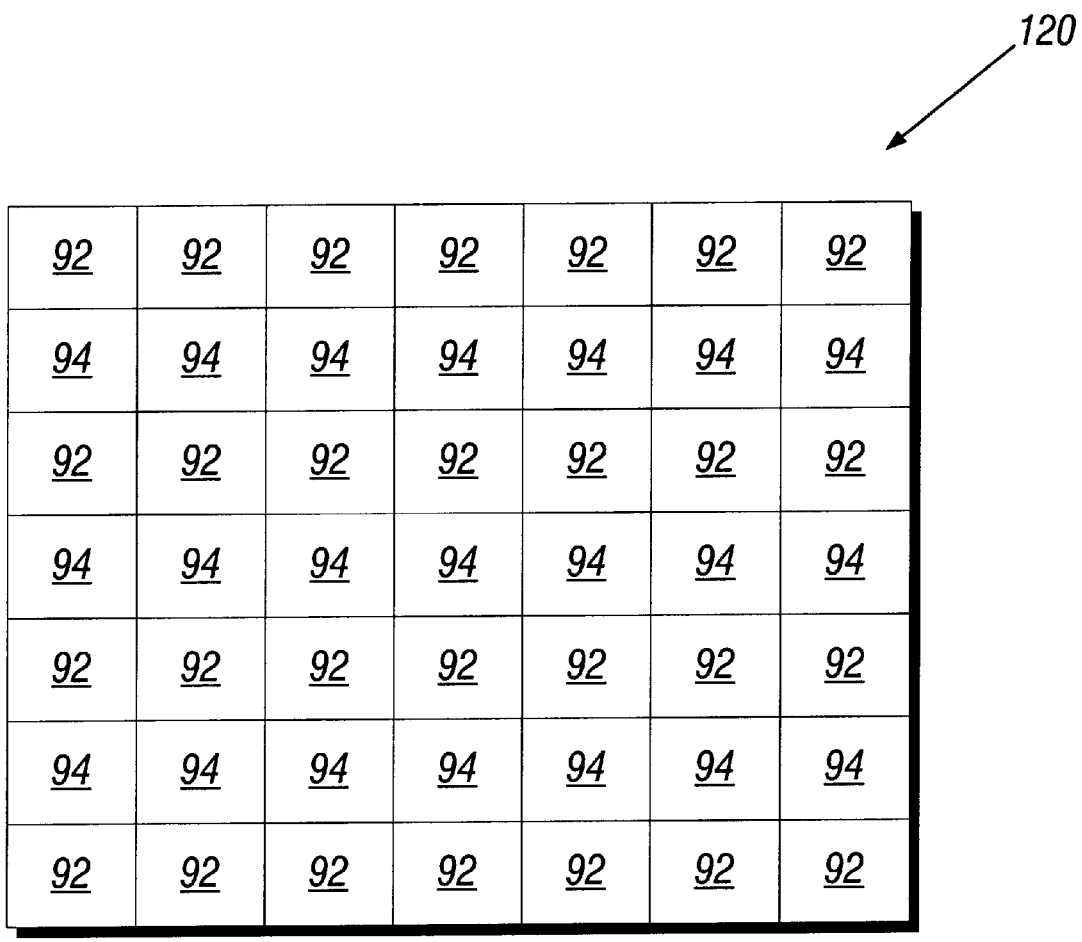

In some embodiments, the image sensors 92 and pixel cells 94 may be arranged in a pattern that is similar to the control/viewing pattern that is formed on the exterior surface 93 of the display screen assembly 56. For example, referring to FIG. 6, a column 99 of light sensors 92 may sense the incoming light that passes through the area 72d (see FIG. 4) of the exterior surface 93. Other arrangements are possible, depending on the mapping performed by the holograms that are stored in the holographic beam splitter 76. For example, referring to FIG. 7, in some embodiments, the exterior surface 93 may be divided by infrared filter strips into alternating columns of rectangular receiving strips 112 and rectangular viewing strips 114. However, referring to FIG. 8, for a particular SLM 120, the holographic beam splitter 76 may map the light that passes through the strips 112 and 114 into alternating rows of light sensors 92 and pixel cells 94.

Thus, the spatial interspersion of the light sensors 92 and pixel cells 94 permits both global and control of the pixel cells 94. For example, referring to FIG. 17, the exterior surface 93 may partitioned into the multiple windows 210. Therefore, as an example, the light sensors 92 that receive light waves from one of the windows 210 may control the intensities of the displayed pixels in that window 210. The groups of infrared filters that filter the light passing through the associated windows 210 may or may not be associated with particular bandstop frequencies, depending on the particular embodiment. In this manner, for some embodiments, two or more windows 210 may be associated with the same bandstop frequency. However, the differences in locations of the windows 210 or the differences in the signatures of the transmitted infrared waves may be sufficient to prevent interaction with one window 210 from affecting an application that produces an image in another window 210.

Figure 9:
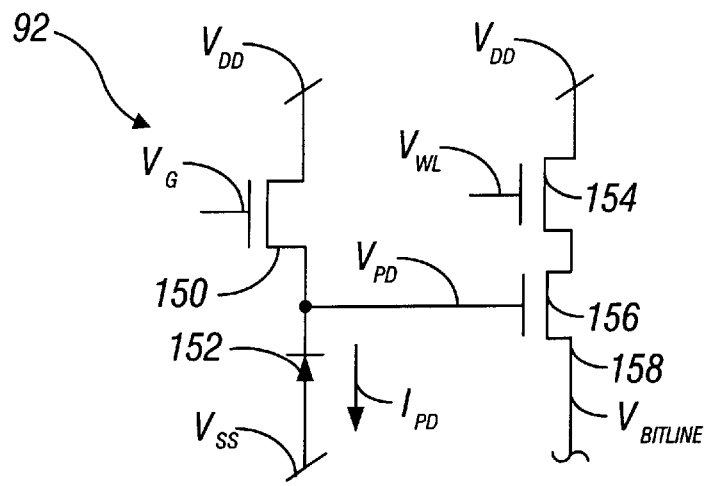
FIG. 9 is a schematic diagram of a light sensor according to an embodiment of the invention.

Referring to FIG. 9, in some embodiments, each light sensor 92 may include an n-channel, metal-oxide-semiconductor field-effect-transistor (MOSFET) 150 that has its drain-source path coupled between a positive supply voltage (called $V_{DD}$) and a sampling node 160. The sampling node 160 stores a charge indicative of the light intensity that is detected by the light sensor 92. The gate of the transistor 150 receives a voltage (called $V_G$) that controls the sampling of the light intensity, as described below.

For purposes of electrically indicating photons of light, the light sensor 92 may include a photosensitive element, such as a photodiode 152, that conducts a current (called $I_{PD}$) in response to the photons striking the light sensor 92. In some embodiments, the cathode of the photodiode 152 is coupled to a source terminal of the MOSFET 150 and also serves as the sampling node 160. The anode of the photodiode 152 may be coupled to a negative voltage supply level (called $V_{SS}$, as shown) or ground, as examples. A significant parasitic capacitor (not shown) may be present between the sampling node 160 and the $V_{SS}$ supply voltage and aid in accumulating a charge that indicates the detected intensity, as described below. The capacitance of this parasitic capacitor may be generally attributable to the gate capacitance of the MOSFET 156 and the capacitance of the photodiode 152.

The light sensor 92 provides an indication of the measured intensity to an associated bitline 158. In particular, the indication in some embodiments, may be provided by a $V_{PD}$ voltage that is sampled (as described below) to furnish a voltage (called $V_{BITLINE}$) to a bitline 158. For purposes of sampling the $V_{PD}$ voltage, the light sensor 92 may include an n-channel MOSFET 156 that functions as a source follower. In this manner, the MOSFET 156 has a gate terminal that is coupled to the node 160, a source terminal that is coupled to the bitline 158 and a drain terminal that is coupled to the $V_{DD}$ positive supply voltage. Another n-channel MOSFET 154 may have its drain-source path coupled in series with the drain-source path of the MOSFET 156 and function to turn on and off the sampling of the $V_{PD}$ voltage. When a voltage (called $V_{WL}$) of the gate terminal of the MOSFET 154 is asserted (driven high, for example), the MOSFET 154 conducts, an event that causes the MOSFET 156 to conduct and furnish an indication of the $V_{PD}$ voltage to the bitline 158. As shown, in some embodiments, the drain-source path of the MOSFET 154 is coupled between the $V_{DD}$ positive supply voltage and the drain terminal of the MOSFET 156. However, in other embodiments, the drain-source path of the MOSFET 154 may be coupled between the source terminal of the MOSFET 156 and the bitline 158.

Referring to FIGS. 10, 11, 12 and 13, the light sensor 92 may operate in the following manner. In particular, the light sensor 92 measures the intensity of the associated pixel using integration intervals (the integration interval from time $T_1$ to time $T_2$ and the integration interval from time $T_5$ to time $T_6$, as examples), each of which is denoted by $T_{INT}$ in FIG. 10. Before the beginning of an exemplary integration interval 139, the $V_G$ signal is asserted (driven high, for example from) time $T_0$ to time $T_1$. The asserted $V_G$ voltage, in turn, causes the MOSFET 150 to conduct and pull the $V_{PD}$ voltage (see FIG. 11) to an initial voltage that is approximately equal to the $V_{DD}$ supply voltage level less the threshold voltage of the MOSFET 150, as an example. To obtain an indication of the initial voltage of the $V_{PD}$ voltage (for purposes of later calculating the integrated intensity), a row decoder 134 (see FIG. 14) asserts the $V_{WL}$ voltage (see FIG. 12) for one row of the light sensors 92 during the time interval from time $T_0$ to time $T_1$ to cause the MOSFETs 154 and 156 to conduct. At time $T_1$, the row decoder 134 deasserts (drives low, for example) the $V_{WL}$ voltage from time $T_1$ to time $T_2$ to turn off the MOSFETs 154 and 156 for the duration of the integration interval 139.

During the integration interval 139, the $I_{PD}$ current of the diode 152 depletes charge stored in the parasitic capacitor that is coupled to the sampling node 160. The depletion of the charge, in turn, causes a linear decline in the $V_{PD}$ voltage (see FIG. 11) pursuant to an approximate slope of $I_{PD}/C$, where "C" represents the capacitance of the parasitic capacitor. At the end of integration interval 139, the $V_{WL}$ voltage is asserted from time $T_2$ to time $T_3$ to cause the MOSFETs 154 and 156 to conduct an indication (i.e., the $V_{BITLINE}$ voltage (see FIG. 13)) of the $V_{PD}$ voltage to the bitline 158. Thus, from the two sampled $V_{PD}$ voltages (one at the beginning of the integration interval and one at the end), the accumulated photons and thus, the intensity of the pixel may be determined.

Figure 14:
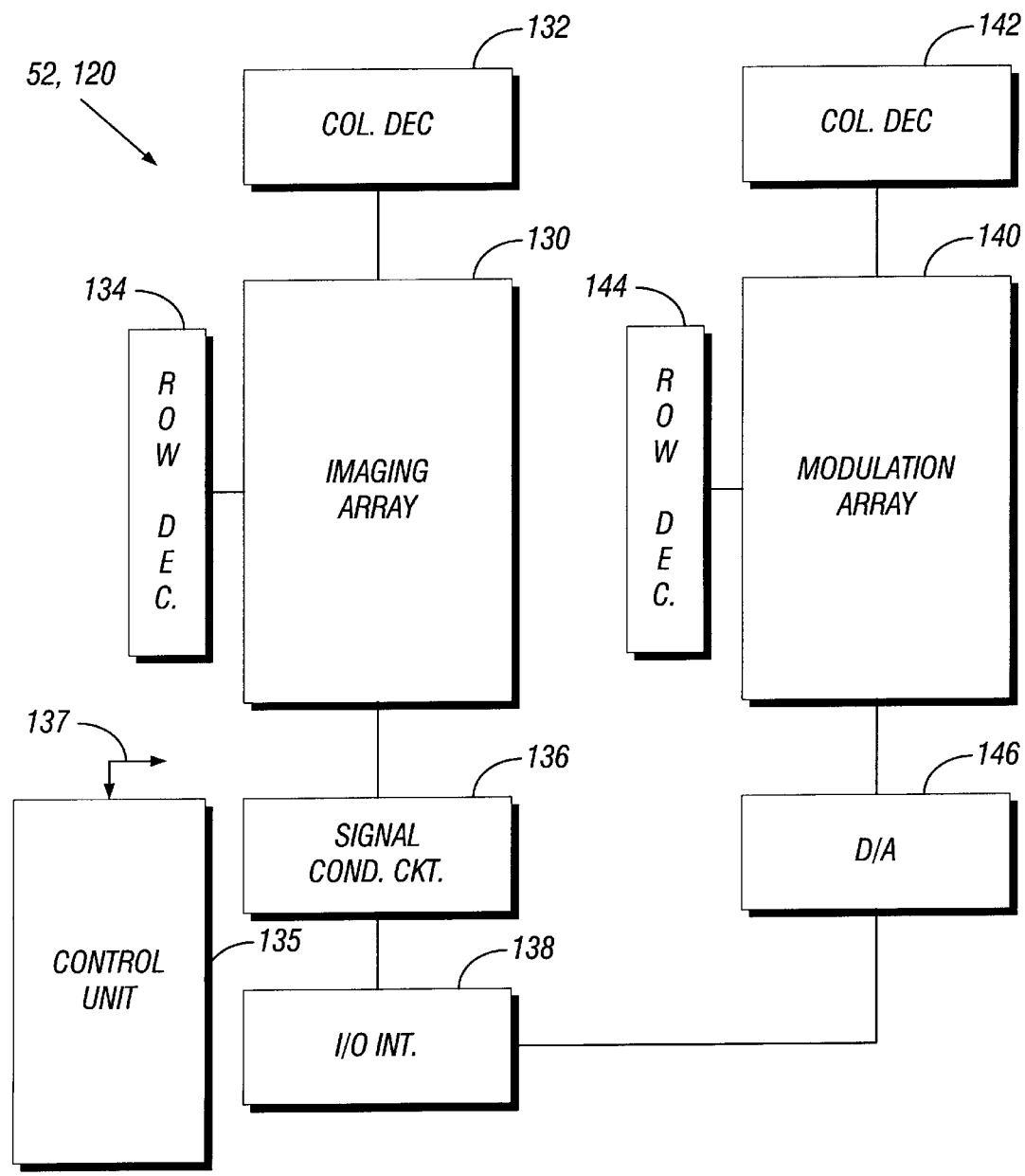
FIG. 14 is a schematic of the spatial light modulator of FIG. 2 according to an embodiment of the invention.

Referring to FIG. 14, in some embodiments, the SLM 50, 120 may include an imaging array 130 of light sensors 92 and a modulation array 140 of pixel cells 94. In this manner, the SLM 52, 120 may include column 132 and row 134 decoders to access the light sensors 92 of the imaging array 130. Signal conditioning circuitry 136 may retrieve analog indications of the sensed intensities from the imaging array 130, filter noise from these indications and provide digital indications to an input/output (I/O) interface 138. Similarly, column 142 and row 144 decoders may access the pixel cells 94 of the modulation array 140 to provide voltages from a digital-to-analog (D/A) converter 146 to the array 140. The D/A converter 146 may receive digital signals from the I/O interface 138. The SLM 52, 120 may include a control unit 135 to coordinate the above-described activities of the SLM 52, 120 via control lines 137.

Figure 15:
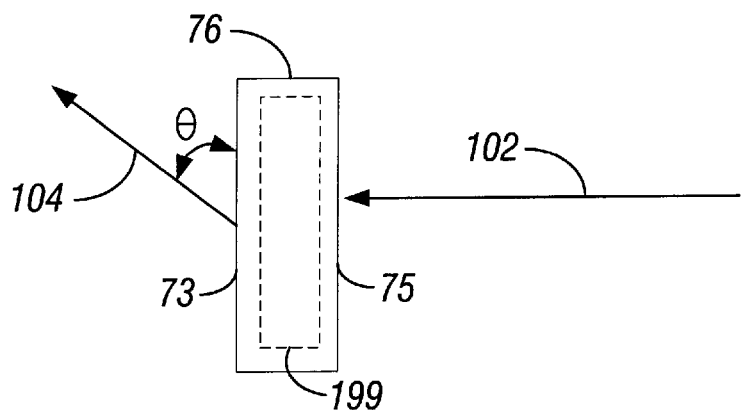
FIG. 15 is a schematic diagram illustrating reconstruction of an object wave using a recorded hologram.

Referring to FIG. 15, in some embodiments, the holographic beam splitter 76 may include a volume recording medium 199 to store at least two holograms, each of which is used to diffract the beams of a different optical channel (a display optical channel and a control optical channel, as examples). In general, the stored hologram permits a reconstructed object wave 104 (such as the unmodulated beam, for example, when exiting the face 73 of the holographic beam splitter 76) to be formed by projecting a reference wave 100 (such as the unmodulated beam when entering the face 75 of the holographic beam splitter 76, for example) onto the face 75.

Figure 16:
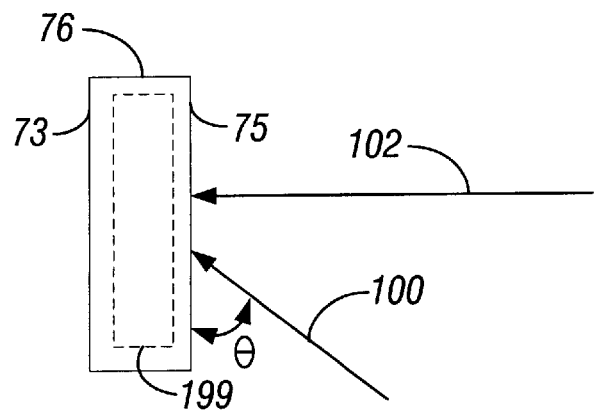
FIG. 16 is a schematic diagram illustrating the recording of the hologram.
Figure 10:
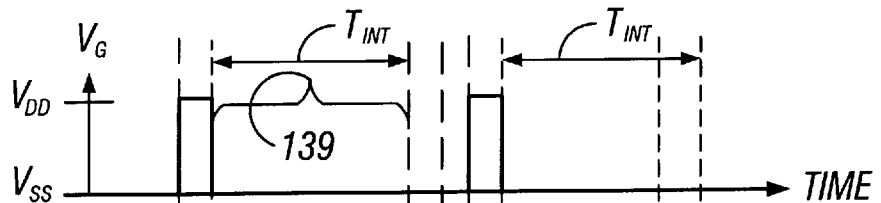
FIGS. 10, 11, 12 and 13 are waveforms illustrating operation of the light sensor of FIG. 9.
Figure 11:
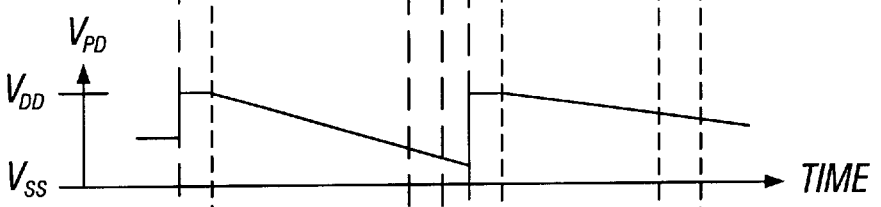
Figure 12:
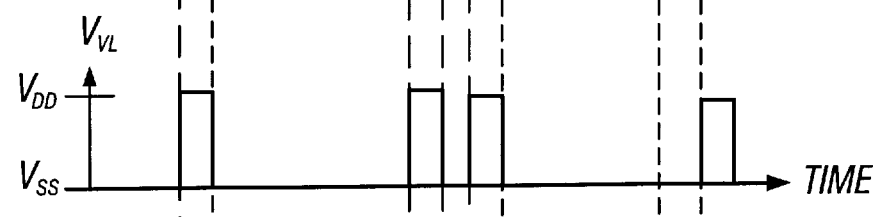
Figure 13:
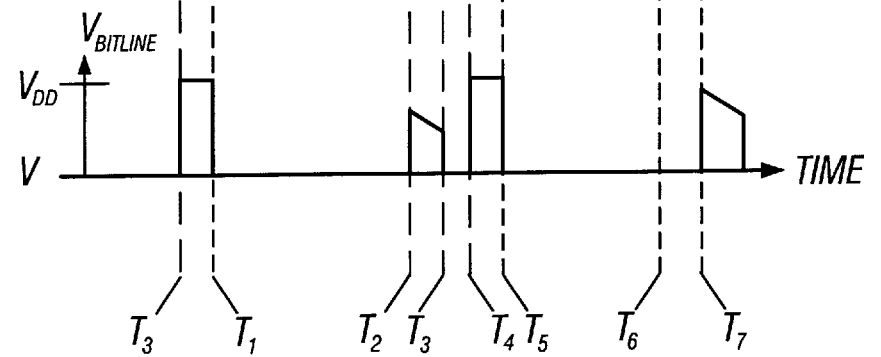

The recording of each hologram may be performed separately from the recording of the other holograms to prevent "washes" from being recorded in the holograms, and the recording of each hologram (for a particular optical channel) may be performed in the following manner. Referring to FIG. 16, a reference wave 102 that is associated with the particular optical channel is projected onto the face 75 of the holographic beam splitter 76. As an example, in some embodiments, the reference wave 102 may be substantially angularly aligned with a normal of the face 75.

For example, to form the hologram for the control optical channel, an LED or laser (in combination with a filter, for example) may project an infrared beam toward the face 75 to form the reference wave 102. Another LED or laser may be used to project another infrared beam toward the face 75 at the angle θ (as shown in FIG. 16) to form the object wave 100. The angle θ determines the course of the optical path 86, the optical path followed by the infrared beam (i.e., the reconstructed object wave 104) when exiting the holographic beam splitter 76. The hologram that is associated with the display optical channel may be recorded in a similar manner.

Mathematically, a hologram for a particular optical channel may be described by the following equation:

$$H=|O+R|^2=|O|^2+|R|^2+OR^*+O^*R, \qquad (1)$$

where the suffix "*" represents a conjugate, "O" represents the object wave 100 and "R" represents the reference wave 102. During reconstruction, the hologram is illuminated with the reference wave 102 again to cause the hologram to diffract the reference wave 102 to produce the reconstructed object wave 104 that is mathematically described below:

$$O_R=H^*R=|O+R|^2*R=R|O|^2+R|R|^2+O|R|^2+O^*R^2, \qquad (2)$$

where "$O_R$" denotes the reconstructed object wave 104. If R=1, then the first term in equation (2) is the original object wave 100, and the remaining light is split up among the other latter three terms. Although, the latter three terms may effect the reconstruction of the object wave 100 for an amplitude hologram, in some embodiments, the hologram recorded in the holographic beam splitter 76 is a phase-only hologram, a hologram that effectively suppresses the latter three terms of equation (1) and results in little light being wasted. The holographic volume recording medium 199 that is used in the holographic beam splitter 76 may be thin or thick and in some embodiments, is a few millimeters thick.

Other embodiments are within the scope of the following claims. For example, the projection system may include more than one SLM. In this manner, the image may be a multicolor image, and the projection system may include one SLM for each primary color. In other embodiments, the projection system may produce a multicolor image by projecting red, green and blue unmodulated beams, for example, onto a single SLM in a time multiplexed fashion. In some embodiments, the light sensors may be separate from the SLM, and in some embodiments, an SLM other than an LCD display panel, such as a grating light valve, may be used. In some embodiments, the bandstop frequencies of the infrared filters may be electrically controlled, a feature that may permit a definable portion of the exterior surface 93 to be configured to receive an infrared wave having a particular bandstop frequency.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A projection system comprising:
   a display panel having an external surface that is adapted to receive a first light wave being indicative of at least one command and an interior surface being adapted to receive a second light wave to form an image on the display panel; and
   a light modulator adapted to produce the second light wave, the light modulator including at least one light sensor integrated with the light modulator and adapted to furnish an electrical indication of said at least one command in response to the first light wave.

2. The projection system of claim 1, wherein the second light wave is associated with a first optical channel, the projection system further comprising:
   a filter adapted to receive the first light wave to produce a third light wave that is received by said at least one light sensor and is associated with a second optical channel.

3. The projection system of claim 2, wherein the first optical channel comprises:
   a channel for spectral components having wavelengths between approximately 400 nanometers to approximately 780 nanometers.

4. The projection system of claim 2, wherein the second optical channel comprises:
   a channel for spectral components having wavelengths above approximately 780 nanometers.

5. The projection system of claim 1, wherein the second light wave is associated with a first optical channel, the projection system further comprising:
   at least one filter adapted to receive the first light wave to produce one or more third light waves that are received by said at least one light sensor and are associated with a second optical channel; and
   a control circuit adapted to regulate the modulator to control pixels of the image in response to said one or more third light waves.

6. The projection system of claim 5, wherein said at least one filter comprises several filters that are spatially interspersed among the pixels of the image.

7. The projection system of claim 1, further comprising:
   an optical system adapted to establish optical communication between the light modulator and the display panel and establish optical communication between the display panel and said at least one light sensor.

8. The projection system of claim 7, wherein the optical system is further adapted to establish the optical communication between the light modulator and the display panel along a first optical path and establish the optical communication between the display panel and said at least one light sensor along a second optical path that is substantially close to the first optical path and directionally opposed to the first optical path.

9. The projection system of claim 1, further comprising:
   a light source adapted to produce an incident light wave on the light modulator to produce the second light wave;
   a shutter adapted to control when the incident light wave strikes the light modulator; and
   a controller adapted to regulate the shutter to selectively turn on and off the incident light wave.

10. A computer system comprising:
    a processor adapted to furnish an indication of an image;
    a display panel having an external surface that is adapted to receive a first light wave being indicative of at least one command and an interior surface that is adapted to receive a second light wave to form an image on the display panel; and
    a light modulator adapted to produce the second light wave in response to the indication provided by the processor, light modulator including at least one light sensor integrated with the light modulator and adapted to furnish an electrical indication of said at least one command in response to the first light wave.

11. The computer system of claim 10, wherein the second light wave is associated with a first optical channel, the computer system further comprising:
    a filter adapted to receive the first light wave to produce a third light wave that is received by said at least one light sensor and is associated with a second optical channel.

12. The computer system of claim 11, wherein the first optical channel comprises:
    a channel for spectral components having wavelengths between approximately 400 nanometers to approximately 780 nanometers.

13. The computer system of claim 11, wherein the second optical channel comprises:
    a channel for spectral components having wavelengths above approximately 780 nanometers.

14. The computer system of claim 10, wherein the second light wave is associated with a first optical channel, the projection system further comprising:
    at least one filter adapted to receive the first light wave to produce one or more third light waves that are received by said at least one light sensor and are associated with a second optical channel; and
    a control circuit adapted to regulate the modulator to control pixels of the image in response to said one or more third light waves.

15. The computer system of claim 14, wherein said at least one filter comprises several filters that are spatially interspersed among the pixels of the image.

16. The computer system of claim 10, further comprising:

an optical system adapted to establish optical communication between the light modulator and the display panel and establish optical communication between the display panel and said at least one light sensor.

17. The computer system of claim 16, further comprising a light source, and wherein the optical system comprises:

a holographic beam splitter adapted to establish optical communication between the light source and the light modulator and between the display panel and said at least one light sensor.

18. The computer system of claim 17, wherein the holographic beam splitter comprises:

a material adapted to establish a first optical channel for the first light wave and a second optical channel for the second light wave.

19. The computer system of claim 16, wherein the optical system is further adapted to establish the optical communication between the light modulator and the display panel along a first optical path and establish the optical communication between the display panel and said at least one light sensor along a second optical path that is substantially close to the first optical path and directionally opposed to the first optical path.

20. The computer system of claim 10, further comprising:

a light source adapted to produce an incident light wave on the light modulator to produce the second light wave;

a shutter adapted to control when the incident light wave strikes the light modulator; and a controller adapted to, regulate the shutter to selectively turn on and off the incident light wave.

* * * * *